(12) United States Patent
Kitchen et al.

(10) Patent No.: US 12,705,307 B2
(45) Date of Patent: Aug. 11, 2026

(54) SYSTEM AND METHOD FOR PARTICLE MORPHOLOGY CLASSIFICATION

(71) Applicant: BWXT Advanced Technologies LLC, Lynchburg, VA (US)

(72) Inventors: Ryan Scott Kitchen, Knoxville, TN (US); Travis Adam McFalls, Knoxville, TN (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 19/007,630

(22) Filed: Jan. 2, 2025

(65) Prior Publication Data

US 2025/0225206 A1 Jul. 10, 2025

Related U.S. Application Data

(60) Provisional application No. 63/617,917, filed on Jan. 5, 2024.

(51) Int. Cl.
*G06V 10/00* (2022.01)
*G06F 18/23213* (2023.01)
(Continued)

(52) U.S. Cl.
CPC ....... *G06F 18/23213* (2023.01); *G06N 20/00* (2019.01); *G06V 10/762* (2022.01);
(Continued)

(58) Field of Classification Search
CPC ............ G06F 18/23213; G06V 10/762; G06V 10/82; G06V 10/774; G06V 20/698;
(Continued)

(56) References Cited

U.S. PATENT DOCUMENTS 8,374,801 B2 * 2/2013 Fuhrman ................. G01J 3/027 702/28
9,710,493 B2 * 7/2017 Wang ...................... G06F 16/35
(Continued)

FOREIGN PATENT DOCUMENTS

WO WO 2018039497 A1 * 3/2018
WO WO 2021144322 A1 * 7/2021
WO 2022/229312 A1 11/2022

OTHER PUBLICATIONS

Jaeeun Lee et al., "Inspection Algorithm of Welding Bead Based on Image Projection", Department of Artificial Intelligence Convergence, Pukyong National University, Published: Jun. 2, 2023, pp. 1-16.*

(Continued)

*Primary Examiner* — Srirama Channavajjala
(74) *Attorney, Agent, or Firm* — Morgan, Lewis & Bockius LLP

(57) ABSTRACT

A method is provided for particle morphology classification. The method includes obtaining input imagery of a particle sample that includes powder particles that are sintered together. The method also includes generating an input dataset for clustering based on the input imagery, including (i) detecting and segmenting powder particles, (ii) extracting and standardizing powder particle images, and (iii) calculating morphology metrics of the powder particles. The method also includes identifying categories, based on geometry or morphology-based similarities between different particles, using K-means clustering on Hu invariant moments of the powder particle images. Some implementations include receiving labels for the categories from a user, and subsequently using the categories to analyze or quantify future batches of particulate based on those labels. Some implementations include pre-categorizing the powder particles, based on size or other characteristics prior to (Continued)

clustering, in order to eliminate larger-scale differences between the powder particles.

15 Claims, 6 Drawing Sheets

(51) Int. Cl.

| | |
|---|---|
| ***G06N 20/00*** | (2019.01) |
| ***G06V 10/762*** | (2022.01) |
| ***G06V 10/764*** | (2022.01) |
| ***G06V 10/774*** | (2022.01) |
| ***G06V 10/82*** | (2022.01) |
| ***G06V 20/69*** | (2022.01) |

(52) U.S. Cl.
CPC .......... *G06V 10/764* (2022.01); *G06V 10/774* (2022.01); *G06V 10/82* (2022.01); *G06V 20/698* (2022.01)

(58) Field of Classification Search
CPC .. G06V 10/764; G06N 20/00; G01N 15/0227; G01N 2015/025; G01N 2015/0238
See application file for complete search history.

(56) References Cited

U.S. PATENT DOCUMENTS

| | | | | |
|---|---|---|---|---|
| 10,546,243 | B1 * | 1/2020 | Irizarry | G06N 3/048 |
| 2007/0003138 | A1 * | 1/2007 | Hobson | G06T 7/149 382/173 |
| 2017/0236055 | A1 | 8/2017 | Lin et al. | |
| 2019/0234853 | A1 * | 8/2019 | Ruffner | G03H 1/0866 |
| 2019/0347278 | A1 * | 11/2019 | Park | G06F 16/2465 |
| 2019/0370384 | A1 * | 12/2019 | Dalek | G06F 16/285 |
| 2020/0218628 | A1 * | 7/2020 | Mathews, Jr. | G06F 11/3409 |
| 2022/0290553 | A1 * | 9/2022 | San Roman Alerigi | E21B 47/26 |
| 2023/0196583 | A1 * | 6/2023 | Godrich | G06T 7/0012 382/173 |
| 2024/0142936 | A1 * | 5/2024 | Jun | G06N 20/00 |

OTHER PUBLICATIONS

A. Jaya Mabel Rani et al., “Clustering Analysis by Improved Particle Swarm Optimization and K-Means Algorithm”, Chennai and Vivekanandha College of Technology for women, Th ird International Conference on Sustainable Energy and Intelligent System VCTW, Tiruchengode, Tamilnadu, India on Dec. 27-29, 2012,pp. 1-6.*

Jae Sakong et al., “Determination of impact fragments from particle analysis via smoothed particle hydrodynamics and k-means clustering”, International Journal of Impact Engineering, 134, 2019, pp. 1-15.*

DeCost et al., “Computer Vision and Machine Learning for Autonomous Characterization of AM Powder Feedstocks”, JOM 69, 456-465 (2017) https://doi.org/10.1007/s11837-016-2226-1.

International Search Report and Written Opinion dated Mar. 7, 2025, issued in corresponding International Patent Application No. PCT/US2025/010151.

* cited by examiner

SYSTEM AND METHOD FOR PARTICLE MORPHOLOGY CLASSIFICATION

RELATED APPLICATION DATA

This application is based on and claims priority under 35 U.S.C. § 119 to U.S. Provisional Application No. 63/617,917, filed Jan. 5, 2024, the entire contents of which are incorporated herein by reference.

STATEMENT REGARDING FEDERALLY SPONSORED RESEARCH OR DEVELOPMENT

The invention described herein was made in the performance of work under DOE Cooperative Agreement No. DE-NE0008744. The Government has certain rights in this invention.

TECHNICAL FIELD

Disclosed implementations relate generally to manufacturing and more specifically to systems and methods for particle morphology classification for manufacturing.

BACKGROUND

Manufacturing operations, such as additive manufacturing, abrasion, solid chemical or fuel production, produce powders and particles. It is possible to recycle the powders and particles if they can be detected and/or identified. Conventional powder characterization systems characterize powder based on size and certain geometric properties, such as width or length ratio, circularity or sphericity, symmetry, convexity, and/or angularity of corners/edges. These systems have several disadvantages. For example, feature types are limited to measurements based on predefined metrics. Complex or unique features may not be defined by these characteristics. Analysts typically need to know or be able to mathematically define the specific attributes they are looking for. Clustering based on this output data often becomes biased towards individual metrics.

SUMMARY

Accordingly, there is a need for solutions for characterizing particles that address at least some of the problems described above. Techniques described herein may be implemented using K-means clustering on the Hu Invariant Moments of particle imagery. The techniques may be used to pre-categorize particles based on size or other characteristics prior to clustering, in order to eliminate larger-scale differences between particles so that the clustering algorithm can find more complex or subtle details. Unlike conventional techniques, the techniques described herein use multiple levels of clustering to create groups within groups in an unsupervised fashion. Some implementations provide an application programming interface (API) or library for a multi-tiered classifier that incorporates multiple types of classifiers (e.g., a decision tree, a random forest, a K-means algorithm, a support vector machine (SVM), and/or a deep learner). Moreover, unlike conventional methods, the techniques described herein may be used to automatically identify, categorize, and quantify powder or particle imagery without specification or previous identification of the features in question. This is useful for characterizing powders and particles used in a wide variety of manufacturing operations including additive manufacturing, abrasion, solid chemical or fuel production, and many other applications. Some implementations use an input of raw imagery from an optical particle measurement system (e.g., a Camsizer), an in-line imaging system, and/or similar a flow-based particle imaging system, to automatically detect and segment out powder particles from the raw input and then identify categories based on geometry or morphology based similarities between different particles in a sample. These categories can then be labeled by a user and used to analyze and/or quantify future batches of particulates based on these features. In this way, the techniques described herein may be used for providing product quality indications, determining if a feedstock is acceptable for manufacturing use, identifying anomalous or defective particle geometries, and determining statistical distributions based on unique feature types.

In accordance with some implementations, a method executes at a computing system. Typically, the computing system includes a single computer or workstation, or a plurality of computers, each having one or more CPU and/or GPU processors and memory. The method does not generally require a computing cluster or supercomputer.

The method includes obtaining input imagery of a particle sample that includes powder particles that are sintered together. The method also includes generating an input dataset for clustering based on the input imagery, including (i) detecting and segmenting powder particles in the input imagery, (ii) extracting and standardizing powder particle images, and (iii) calculating morphology metrics of the powder particles. The method also includes identifying categories in the input dataset, based on geometry or morphology-based similarities between different particles, using K-means clustering on Hu invariant moments of the powder particle images.

In some implementations, the method further includes receiving labels for the categories from a user, and subsequently using the categories to analyze or quantify future batches of particulates based on those labels.

In some implementations, the method further includes pre-categorizing the powder particles, based on size or other characteristics prior to clustering, in order to eliminate larger-scale differences between the powder particles. In some implementations, the pre-categorizing is performed using a size classifier that classifies the powder particles into a plurality of size categories based on particle size distribution. In some implementations, each size category is further categorized using a respective K-means classifier. Each K-means classifier categorizes the powder particles into a respective set of one or more categories.

In some implementations, the plurality of size categories includes (i) a category for small particles, which account for a minimal amount of the total volume of the particle sample, (ii) a category for particles within predetermined size specifications, and (iii) a category for particles that are (a) outside of the predetermined size specifications or (b) defective.

In some implementations, the method further includes using multiple levels of unsupervised clustering to create groups within groups, when identifying the categories.

In some implementations, identifying the categories is performed using a multi-tiered classifier that incorporates a plurality of types of classifiers.

In some implementations, the method further includes receiving the number of desired categories from a user, and applying K-means clustering on Hu invariant moments to create the number of desired categories.

In some implementations, the method further includes: displaying identified categories to a user; receiving labels for the identified categories and a new set of categories after removal of redundant categories, from the user; and saving a model comprising the new set of categories and the labels for subsequent categorization of particle samples. In some implementations, the method further includes repeating applying the K-means clustering on Hu invariant moments to categorize the particle sample based on the new set of categories.

In some implementations, the method further includes training random forest or support vector machine (SVM) classifiers on the Hu invariant moments; and using the trained random forest or SVM classifiers to further categorize the identified categories based on fundamental attributes of the identified categories.

In some implementations, the method further includes: training a convolutional neural network or a deep neural network on the input imagery based on the identified categories, to identify features that have higher complexity than the identified categories and a higher degree of accuracy than metrics-based measurements of the Hu invariant moments; and using the trained convolutional neural network or the deep neural network to identify the features for particle samples.

In some implementations, the input imagery is obtained from an optical particle measurement system, an in-line imaging system, or a similar flow-based particle imaging system.

In some implementations, the K-means clustering ignores a metric of the Hu invariant moments that differentiates based on reflection, for particle morphology.

In some implementations, a computing system includes one or more computers. Each of the computers includes one or more processors and memory. The memory stores one or more programs that are configured for execution by the one or more processors. The one or more programs include instructions for performing any of the methods described herein.

In some implementations, a non-transitory computer readable storage medium stores one or more programs configured for execution by a computing system having one or more computers, each computer having one or more processors and memory. The one or more programs include instructions for performing any of the methods described herein.

Thus, methods and systems are disclosed that efficiently classify morphology of particles in manufacture parts.

BRIEF DESCRIPTION OF THE DRAWINGS

For a better understanding of the disclosed systems and methods, as well as additional systems and methods, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
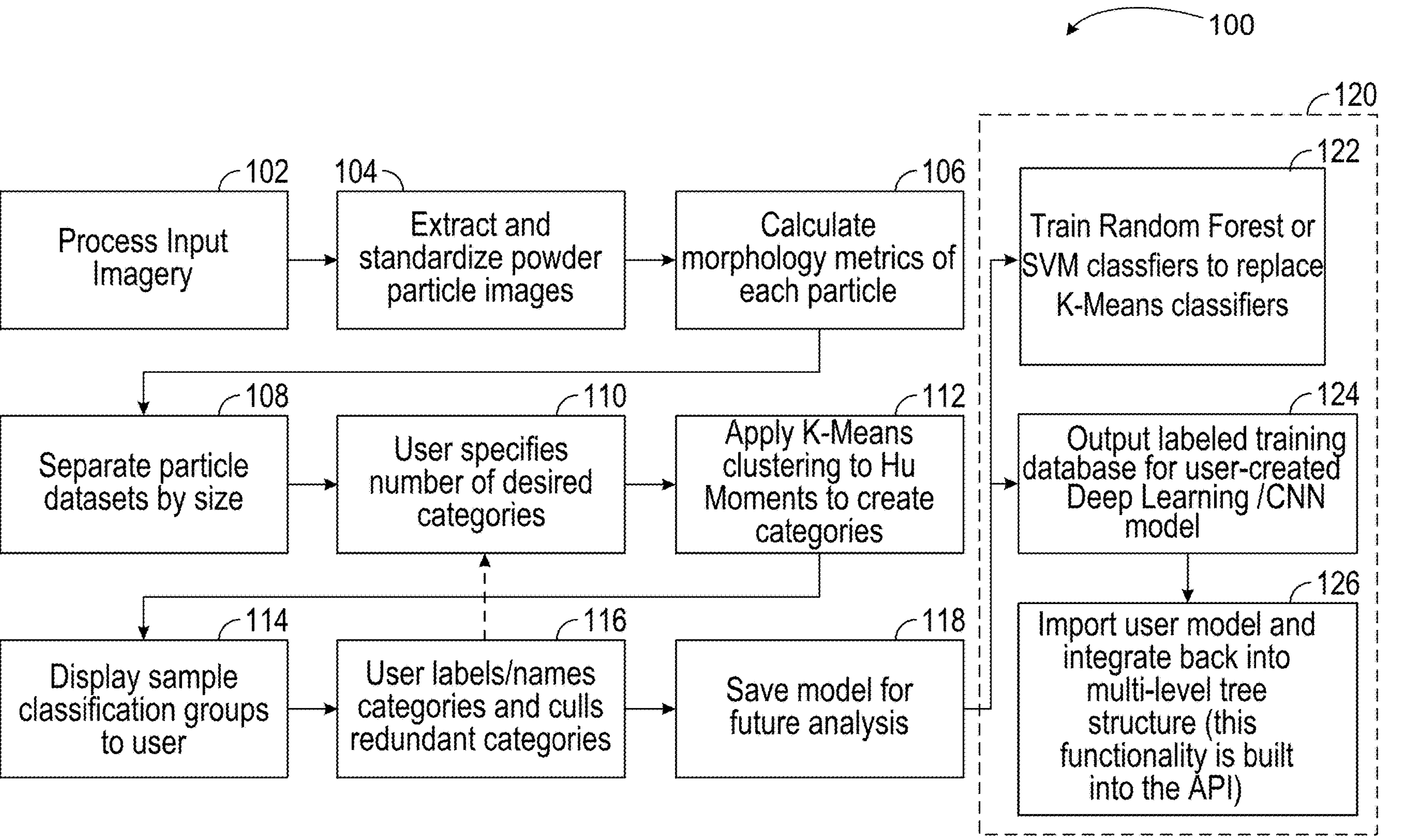
FIG. 1 provides a process flow of a process for particle morphology classification, according to some implementations.

FIG. 1 shows a process 100 for particle morphology classification, according to some implementations. Some implementations process (102) input imagery, extract and standardize (104) powder particle images, and calculate (106) morphology metrics of each particle. Some implementations process input imagery (e.g., to detect and segment powder particles in the input imagery) and extract and standardize powder particle images by performing one or more of the following steps: (i) threshold images to obtain silhouettes of powder particles; (ii) detect contours in images to identify individual powder particles; (iii) filter contours if necessary based on image source and characterization requirements (e.g., minimum or maximum particle size); and (iv) draw each contour centered on a blank image of a standardized size. In some implementations, Camsizer imagery is used. Based on the size of the sieved particles, the image size for each individual particle is limited to 128×128 pixels in some implementations, so a 128×128 target image can be used for the blank image. Some implementations create an input dataset for clustering by performing one or more of the following steps: (i) create an empty array of size N by M, where N is the number of detected particles and M is the total number metadata attributes or metrics selected; and (ii) calculate morphology metrics of each particle and store it in an output array, including Hu Moments, particle area (if desired), circularity (if desired), and/or other similar metrics (e.g., concavity, maximum surface angle (sharpness), and/or convex hull area).

Some implementations separate (108) particle datasets by size. Some implementations obtain a user input (e.g., input provided via a graphical user interface (GUI)) that specifies pre-sorting metrics and/or a hierarchy based on traditional geometric features. In some implementations, size is the first category. This is because most manufactured particles have a specified size with error bars or distribution around it, with the majority of the particles by volume falling into this size category. The quantity of particles of other sizes may be orders of magnitude different, which harms the ability to effectively cluster and train classifiers due to an imbalanced training set. For example, based on experiments that analyzed powder samples, there were three size categories with different characteristics: (i) an extremely high number of very small particles which accounted for a minimal amount of the total volume (essentially dust created by friction between particles), (ii) a large number of particles within size specifications, and (iii) a small number of particles that were out of specification or defective in some way. Pre-separating these groups by size enables clustering algorithms to identify significantly more meaningful categories.

Some implementations obtain (110) the number of desired categories. For example, a user specifies the number of desired output categories.

Some implementations apply (112) K-means clustering to Hu moments to create categories. Hu moments are measured properties of an image that do not change, or only change minimally when an image is transformed using rotation, scaling, blurring, or translation. Each Hu moment is a vector of 7 floating point values. The Euclidian distance (linear distance) between two such vectors for two different images represents a measurement of geometric similarity between them. K-means clustering is used for clustering N vectors/points into K categories based on proximity to other vectors. Once trained or solved on an initial dataset, new data points can be sorted into these categories by finding the distance to the "mean value" or centroid of each category, and picking the minimum distance. These algorithms are particularly well suited for each other because they both utilize a distance-based metric to make comparisons between vectors. This differs from traditional metrics, such as size, circularity, and other similar metrics. These traditional metrics may have varying degrees of significance in numeric change. Due to the variation, weights and normalization have to be determined for each metric in order to eliminate bias towards any particular metric. In some implementations, the Hu moments metric that differentiates based on reflection is ignored for particle morphology.

Some implementations display (114) sample classification groups to a user, and/or allow (116) the user to label or name categories and cull redundant categories. Some implementations display samples (e.g., 25 samples) from each classification group to the user. Experiments may be used to determine the number of samples for each group. Some implementations provide an option for the user to refresh or view additional batches of samples. In some implementations, the user may perform one or more of the following actions to each group: (a) label the group with a name/description; (b) perform an additional clustering on the group members (create a subgroup or branch). This step (b) may include returning to apply K-means clustering to Hu moments, and/or adding a new model to the tree. This step may be performed when the user identifies multiple types of particles in the sample view that they would like to differentiate. This may be useful when, for example, there are large-scale categories of geometric features (e.g., circles versus squares), and the user wants to then differentiate based on subtle features within the types (e.g., smooth surface versus rough surface); and (c) cull redundant groups. Culling may be necessary because the number of groups is arbitrarily chosen. Some groups may be very similar and separated based on arbitrary or irrelevant characteristics. Because of the way K-means classifiers work (selecting the nearest centroid), groups can be deleted without affecting the performance of the classifier.

Block 120 shows optional steps in some implementations. Some implementations train (122) random forest or SVM classifiers to replace K-Means classifiers. Some implementations output (124) a labeled training dataset for training a deep learning model (e.g., a convolutional neural network). K-means is very useful for identifying groups or categories where no labeled training data is available. However, once categorized or labeled data is produced, other algorithms can determine more fundamental attributes of the categories. Trained algorithms, such as a Random Forest or a Support Vector Machine (SVM), can have superior reproducibility of results, using the same Hu moments input data. Convolutional neural networks (CNNs) or deep learners can be trained directly on the input images using the labels produced by K-means, and used to identify features with significantly more complexity and with a higher degree of accuracy than metrics-based measurements, such as Hu moments. To illustrate, the Hu moments or K-means clustering may distinguish the difference between the silhouette of a cat and a silhouette of a dog based on some statistical characteristics of the image, but a CNN can distinguish based on the shape of the ears or the curvature of the tail. By using CNNs for this task, the accuracy and utility of these classifications can be significantly increased. Some implementations allow the user to train Random Forest and SVM classifiers and use them as part of the classification tree. Some implementations also include a function to export labeled training data with the Hu moments or geometric attributes and/or the images. Some implementations allow the user to integrate their own, custom-made classifiers into the classification tree by providing a vector predict or image predict function to replace the K-means function. Some implementations allow the user to import (126) the deep learning model into a multi-level tree structure.

In some implementations, the steps of applying (112) K-means clustering, displaying (114) the sample classification groups, and allowing (116) the user to label or name categories and cull redundant categories, may be repeated until the user is satisfied with the categories, and/or when the system determines the number of categories has not changed after a predetermined number of iterations (e.g., 10 iterations).

Some implementations store (118) a model representing the categories for future analysis. In some implementations, the model includes a prediction tree object. Some implementations wrap the prediction tree object into a Python Pickle file, including the training data for each branch. In some implementations, the model is used to quantify and/or characterize additional batches. For example, after the initial clustering/training step, the classification tree can be used to predict the category of any individual particle or dataset of particles. The particle images may be provided in the same image size and resolution as the original training. Some implementations provide a Python API to quantify and/or characterize additional batches. The techniques described herein may be integrated directly into control systems or other applications.

Some implementations use a tree-based object (a term used in Object Oriented Programming) structure to produce analysis and predictions. In some implementations, the tree-based object (sometimes referred to as the prediction tree object) includes a classifier object with the following member functions/variables: (i) input type specifier (defined as a vector, an image, or a combination of the two); (ii) one of: a vector predict function (vectors), an image predict function (images), or a combined predict function (vectors, images); (iii) in some implementations, a training function (inputs, labels); (iv) in some implementations, a cluster function (inputs, labels); (iv) the number of output classes or categories (this number does not change if classes are culled); and/or (v) a list/vector of output class label strings. In some implementations, the prediction tree object includes a Boolean flag to indicate whether this classifier has been culled. In some implementations, the prediction tree object includes a list or vector of child or branch classifier prediction tree objects. If any class is culled, the object is present to preserve output classification numbering. In some implementations, the prediction tree object includes a recursive leaf count function, which returns the output class count if there are no children, or the sum of the leaf counts from all of the children. In some implementations, the prediction tree object includes a predict function. This is a helper function to the classifier, which performs one of the following operations: (a) execute classifier "predict" on input data using the appropriate function; (b) if children/branches are present, (i) prepare datasets for children based on classifier results, (ii) recursively execute the children's "predict" functions, (iii) renumber the output classifications based on the order of the branches and their respective leaf numbers, and/or (iv) concatenate the results back into a single list/vector; and/or (c) return the results. In some implementations, the prediction tree object includes a function to get the names of all of the classes, paired with their class number. This recursively fetches the names and numbers from child tree objects.

Figure 2:
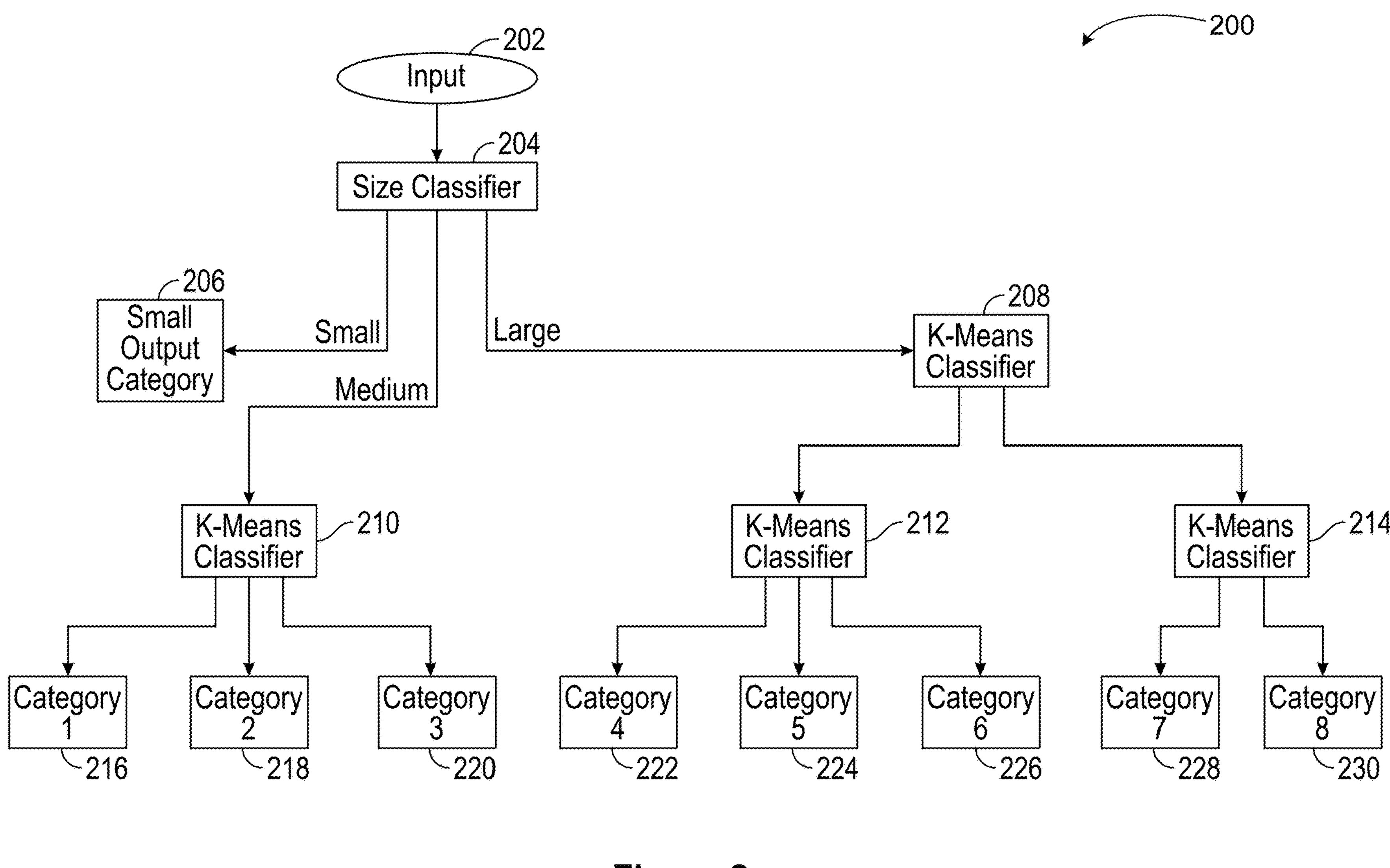
FIG. 2 shows an example multi-level prediction tree for particle morphology classification, according to some implementations.

FIG. 2 shows an example multi-level prediction tree 200 for particle morphology classification, according to some implementations. Input 202 (e.g., raw images) is input to a size classifier 204, which categorizes the input into either the small category (the arrow labeled Small), the medium category (the arrow labeled Medium), or the large category (the arrow labeled Large). Size categories can be either user specified or automatically determined based on particle size distribution. The number of branches in each category may be arbitrary or may be determined based on user selection. After a user culls some categories, the prediction tree may include a different number of branches at different levels. In the example shown, the small output category is output in block 206, without further classification. The medium category on the other hand is further classified using a K-means classifier 210 that classifies the input according to three categories 1, 2, and 3 (labeled 216, 218, and 220, respectively). The large category is first classified using a K-means classifier 208 and subsequently classified using two different K-means classifiers 212 and 214. The classifier 212 classifies the input into categories 4, 5, and 6 (labeled 222, 224, and 226, respectively), and the classifier 214 classifies the input into categories 7 and 8 (labeled 228 and 230, respectively). Some implementations provide a default or initial prediction tree (e.g., a size classifier at a first level followed by different number of classifiers for different size categories). After a user examines the categories and/or culls the categories, some branches may be removed. When the prediction tree generates appropriate categorization for a sample, the prediction tree may be stored for use with subsequent samples.

Conventional systems perform clustering based on a small number of scalar values that are representative of some variables. On the other hand, the techniques described herein can be used to obtain the shape of an object and then condense it down to a representation so as to be clustered into categories that are not predefined by the user. These techniques are particularly useful when there are unknown materials, for identifying different types of materials within a particular sample set without having any knowledge of what those materials are and how many there are in that particular set. Some implementations identify different types of materials. Such materials may be used for powder recyclability studies on metal powder, which has been subject to aggressive processes, including partial welding and then sandblasting. The techniques can be used to determine the types of particles that are present in the data in the sample, as opposed to using a powder that is uniform and does not have any kind of unusual particle shapes and sizes. Some implementations identify types of particles that can be used to manufacture components using the recycled materials. The techniques allow simultaneous identification of different types of categories, and detection and quantification of different kinds of particles.

The particles described herein are typically loosely fused together in a welding process and then they are broken apart. Initially, the particles may be spherical. Subsequently, some particles are still spherical but some of them are welded together more than others and so they do not actually break apart during the recycling process. In some implementations, a metal powder has been subject to a sintering process where the powder is taped together and then heated to near the point where it starts to melt, which causes edges of particles to start to melt together where the particles are in contact with each other. The particles may not agglomerate into larger balls but they will usually adhere together and then the process of recovering it involves breaking those apart using mechanical means (e.g., through sandblasting and other processes). The resulting particles are broken out of this larger structure. Some powders may include debris. Some implementations include a category for debris that is segmented out using the same process. It is sometimes not practical to predict different kinds of particles in this process. For example, it may not be possible to recognize that a number of particles have a popcorn shape instead of a round shape or something similar. The techniques described herein may be used to automatically identify the different types of particles in the sample without knowing what they are going to look like. The powder may include millions of particles that are being analyzed. Some implementations cluster the particles into groups. Beyond clustering into shapes, some implementations then subcategorize the shapes within those categories if the categories are large enough to do so. There may be primary attributes of these type of particles that are easy to identify using conventional classifiers. For instance, conventional methods may determine that a particle is made of two original spheres instead of three or four. The classification is very complex when multiple shapes (e.g., multiple circular shapes) are fused together. Accordingly, some implementations determine categories, and then define subcategories. This characterizes the particles based on other attributes that are not the primary attributes. In this way, at the end of the classification, a wider range of types of particles with the primary and secondary attributes can be identified. It is noted that the powders classified may not be used for any traditional form of welding. The techniques described herein are not specific to additive manufacturing and not limited to metal powders or powders used for additive feedstock. These techniques may be used to analyze other types of particles for different purposes (e.g., manufactured fuel particles).

Some implementations use a particle analyzer (e.g., a Camsizer). A particle analyzer or a powder analyzer obtains different powder samples and passes the powder in front of two high speed cameras. Some implementations obtain millions of images of data of individual powdered particles. The particle analyzer may perform rudimentary analysis. When there are millions of images, the techniques described herein provide a way to characterize and group these images into clusters. A particle analyzer provides raw images and may use compressed gas to blow particles through a tube so that they are dispersed enough that they can be individually imaged. The particle analyzer obtains output imagery for these particles. Some particle analyzers identify multiple particles within the same images but the particles are distributed enough within the tube areas of the analyzer that they are substantially not touching each other. The particles are spread out but there may be a thousand particles in an image. Even if some particles are touching each other, the powder analyzer is able to differentiate that because it uses multiple cameras in order to identify the individual particles. Some of the particle analyzer models also have the ability to scan the particles in three dimensions and can use laser scanning. These machines and the techniques described herein can be used as part of a production setting or in a stand-alone setting. Some implementations obtain the imagery and then analyze it based on a variety of different metrics. Some implementations create a metric that can be used for the purpose of clustering that is not based on the size or shape (e.g., circularity) of particles. Some implementations use Hue moments for shape analysis, which is inherently rotation, translation, and size invariant. This allows the implementations to get secondary shape characteristics such as textural features and quantify those into arbitrary scalar values. This in turns allows analysis of aspects beyond the shape of the particle and additional features and classifying the particles based on those additional features.

Some implementations obtain an initial sample of powder after recycling the powder multiple times. Subsequently, the system defines categories of the particles using one or more classifiers. After discovering categories, those type of particles can then be identified in future samples. Some implementations pass a sample from a different batch through the one or more classifiers with the already determined categories, and compare different batches using those categories that were automatically determined from the initial sample. Based on the volume percentage of certain types of categories, some implementations determine a threshold for associating certain categories with degrading quality. Some implementations determine that a powder has been used some number of times and varies the threshold. Some implementations determine that a powder has been used a predetermined number of times (e.g., 6 times) and determine that, based on the threshold, a powder sample needs to be replaced or diluted with fresh powder, for further analysis. Some implementations use a baseline profile of fresh powder.

Figure 3A:
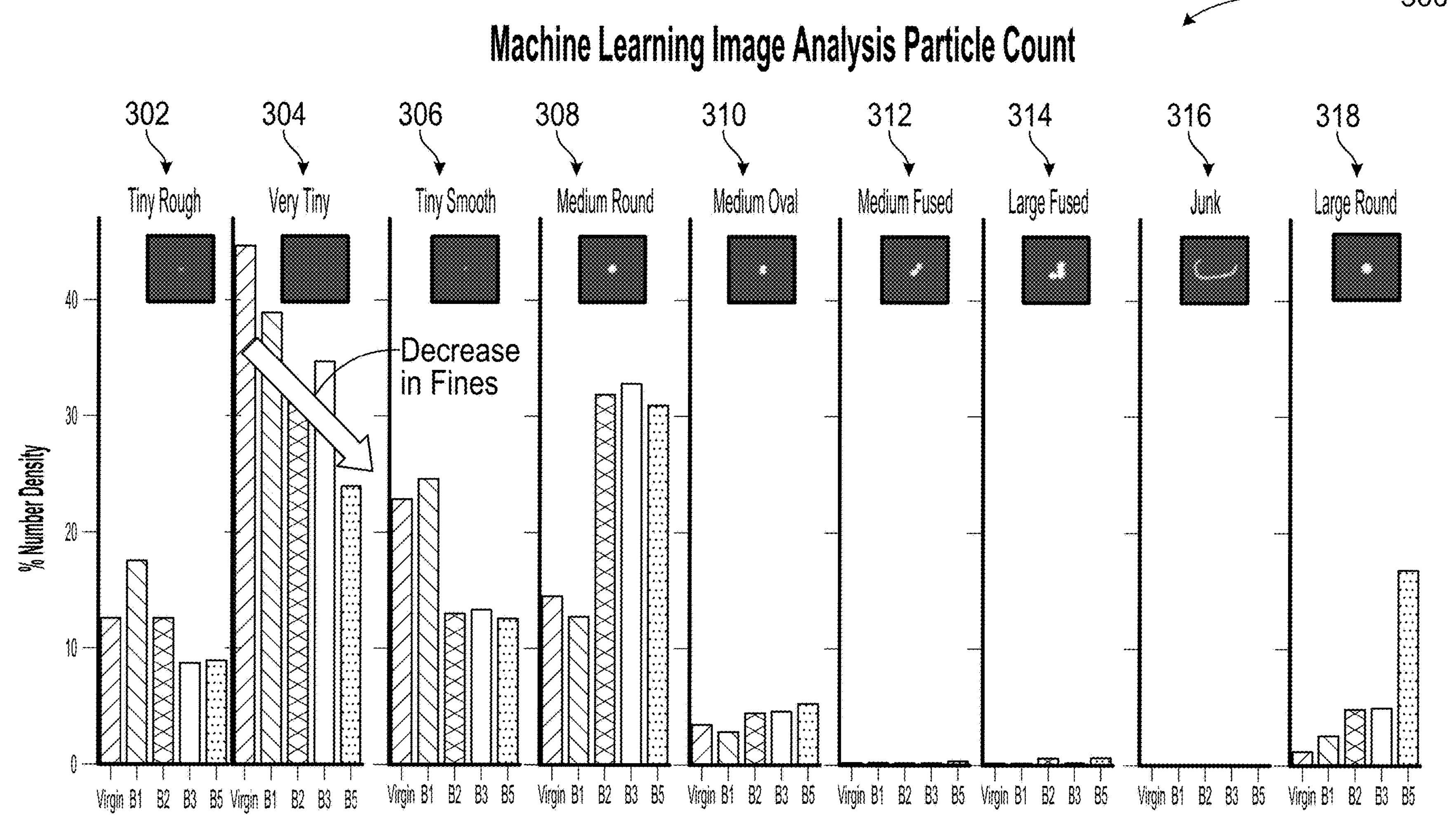
FIG. 3A shows a graph plot of example test results of image analysis, according to some implementations.

FIG. 3A shows a graph plot 300 of example test results of image analysis, according to some implementations. The graph is a bar chart for percentage number density (particle counts) for different particles of different shapes. These test results were obtained using Camsizer images from several batches of metal powder used on Arcam Spectra H, in order to determine the effects of repeated powder recycling on powder morphology. Training data for this model was obtained from a randomly combined mix across the sample in order to differentiate new types of particles caused by recycling from those present in virgin or unused powder. Categories were labeled based on visual description. The example shows categories tiny rough 302, very tiny 304, tiny smooth 306, medium round 308, medium oval 310, medium fused 312, large fused 314, junk 316, and large round 318. Each pattern represents the quantity of a specific type of particle in each batch of the powder. The example shows batches labeled virgin, B1, B2, B3, and B5. The virgin batch has never been used before. It is highly circular, and contains minimal, if any, types of agglomerated powder as compared to the other types. B1, B2, B3, and B5 are recycled powders that have then been blended with some additional virgin powder in order to reduce the number of adverse shapes and material inside of them. The bars represent the amount of total particles, not the total volume of particles. Even though some of the bars are small for the medium and large fused and large round categories, those quantities represent the majority of the powder. The graph also shows a trend going from fine powder into increasingly large and agglomerated powder and then also in various kinds of fused and shaped powder. The unsupervised clustering model described herein successfully identified meaningful different categories of particles based on morphology. Results shown are a subset of the categories identified due to total relevance. The model reliably identified powder particles that had been sintered together, and further classified them based on the number of original particles and the level of fusion between the particles (the example shows oval and medium fused, but more categories were originally present). These results were observed on repeated runs with both the same and different data, indicating the repeatability of the clustering mechanism.

Figure 3B:
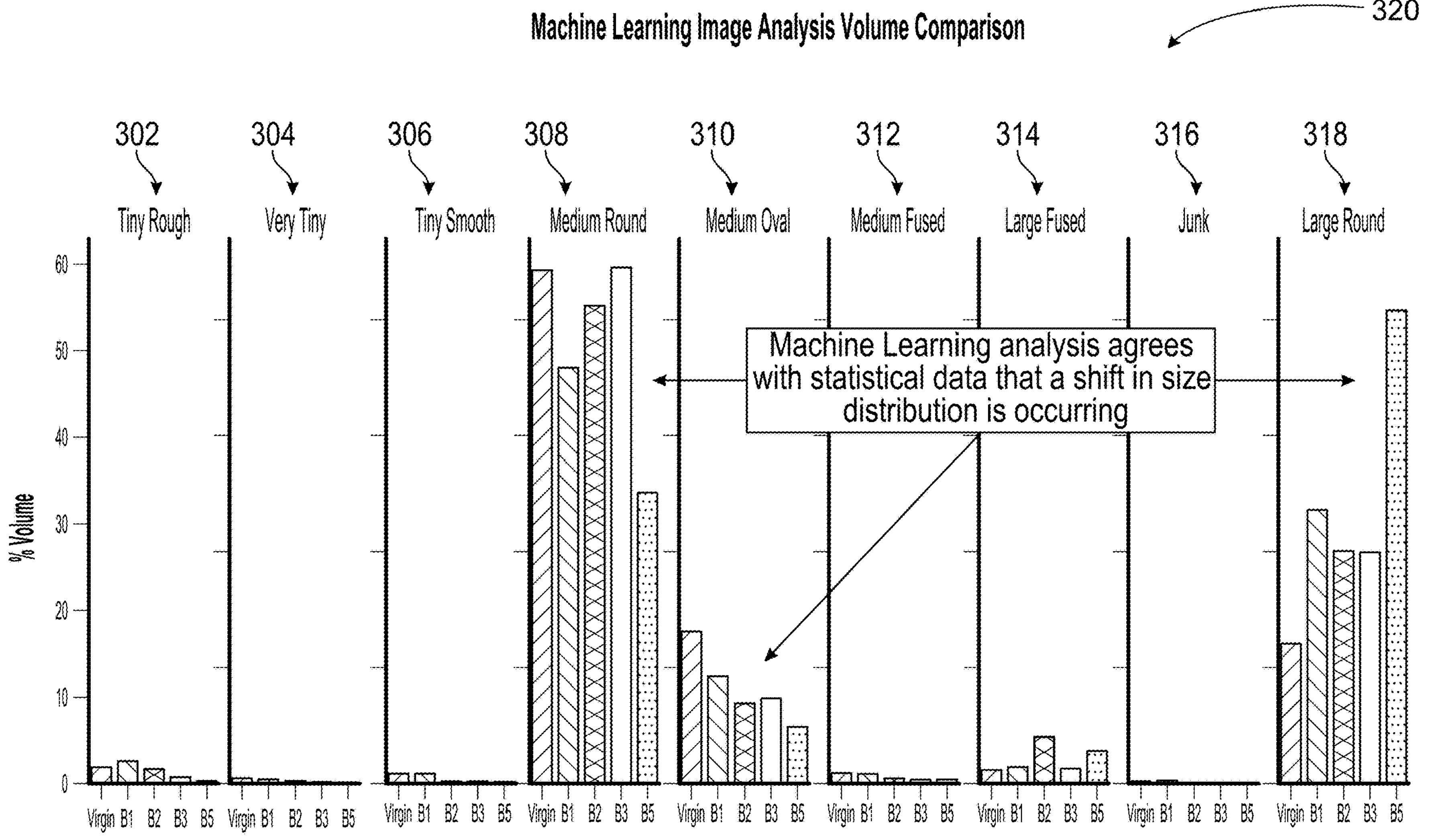
FIG. 3B shows another graph plot of example test results of image analysis, according to some implementations.

FIG. 3B shows another graph plot 320 of example test results of image analysis, according to some implementations. This uses the same categories 302-318 as in FIG. 3A. This graph shows volume comparison for different particles (categories similar to FIG. 3A). Each bar represents volume percentage for a respective category and a respective batch. The example results agreed with statistical data that a shift in size is occurring. Powder samples tend to have unique types of particles that may have a major impact on the analysis, but such particles may be one in a million or one in ten thousand particles. Therefore, naive statistical techniques are ineffective because particles of interest are quite anomalous in nature and may not have macro-scale changes compared to other particles. For instance, for various shapes of popcorn versus peanut shapes agglomerated powders, powders that are highly agglomerated into more spherical shapes are of higher quality than the ones that create sharp edges. However, based on just using a metric of circularity, for instance, those features would not be discernable because they still fall within the standard distribution of circularity ranges.

Figure 4:
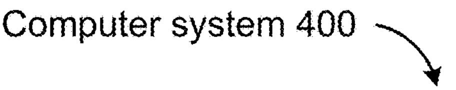
FIG. 4 is a block diagram illustrating a computing device in accordance with some implementations.
Figure 4:
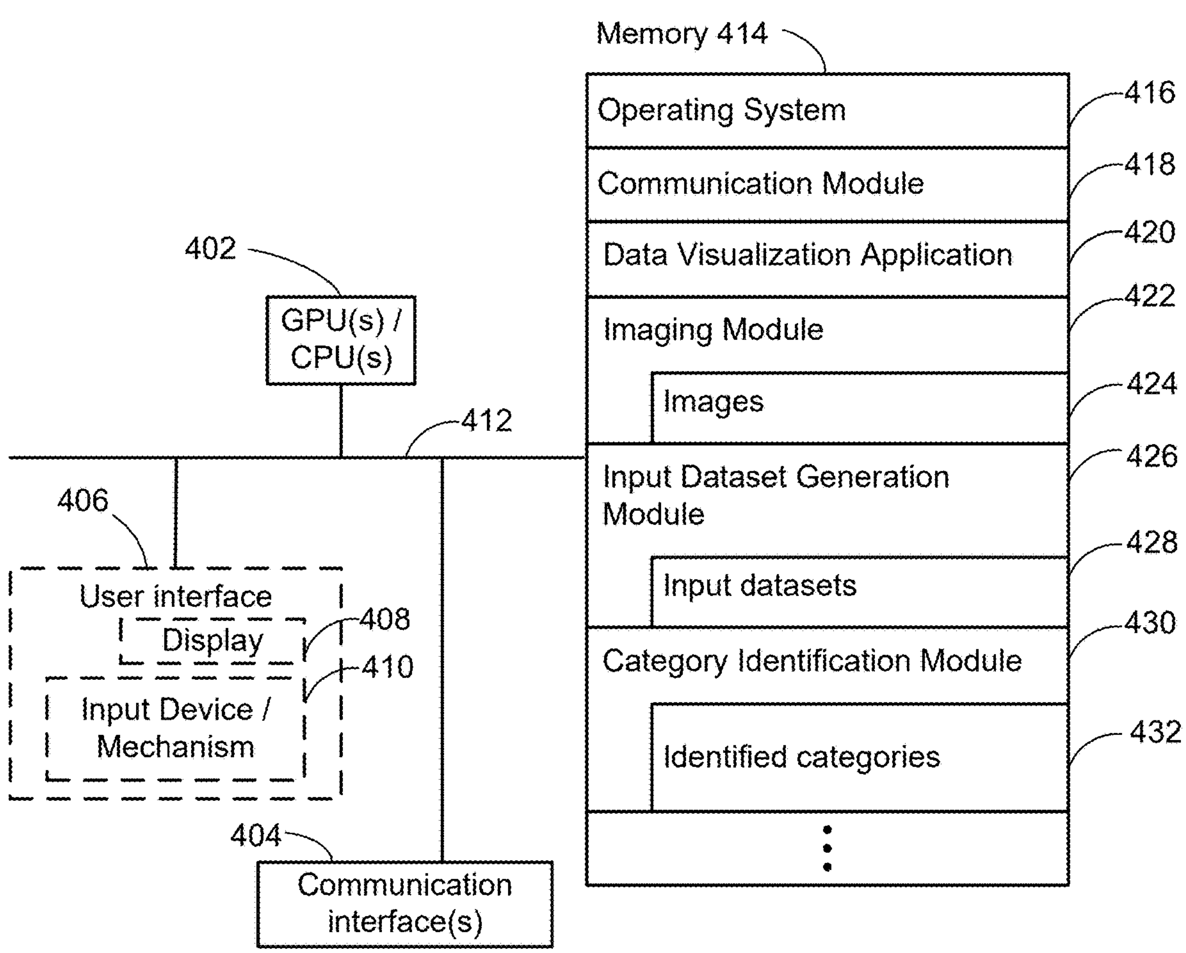

FIG. 4 is a block diagram of a computing device (or computer system) 400 in accordance with some implementations. Various examples of the computing device 400 include high-performance clusters (HPC) of servers, supercomputers, desktop computers, cloud servers, and other computing devices. The computing device 400 typically includes one or more processing units/cores (CPUs and/or GPUs) 402 for executing modules, programs, and/or instructions stored in the memory 414 and thereby performing processing operations; one or more network or other communications interfaces 404; memory 414; and one or more communication buses 412 for interconnecting these components. The communication buses 412 may include circuitry that interconnects and controls communications between system components.

The computing device 400 may include a user interface 406 comprising a display device 408 and one or more input devices or mechanisms 410. In some implementations, the input devices include a powder analyzer or particle analyzer, such as a Camsizer, which may be used to obtain raw images of samples of particles. In some implementations, the input device/mechanism includes a keyboard. In some implementations, the input device/mechanism includes a "soft" keyboard, which is displayed as needed on the display device 408, enabling a user to "press keys" that appear on the display 408. In some implementations, the display 408 and input device or mechanism 410 comprise a touch screen display (also called a touch sensitive display).

In some implementations, the memory 414 includes high-speed random access memory, such as DRAM, SRAM, DDR RAM or other random access solid state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the GPU(s)/CPU(s) 402. The memory 414, or alternatively the non-volatile memory device(s) within the memory 414, comprises a non-transitory computer readable storage medium. In some implementations, the memory 414, or the computer-readable storage medium of the memory 414, stores the following programs, modules, and data structures, or a subset thereof:

- an operating system 416, which includes procedures for handling various basic system services and for performing hardware dependent tasks;
- a communications module 418, which is used for connecting the computing device 200 to other computers and devices via the one or more communication network interfaces 404 (wired or wireless) and one or more communication networks, such as the Internet, other wide area networks, local area networks, metropolitan area networks, and so on;
- an optional data visualization application or module 420 for displaying visualizations of 3D models;
- an imaging module 422 for obtaining images 424. For example, the imaging module 422 may obtain raw imagery from a powder or particle analyzer (e.g., a Camsizer) and/or process or prepare the images for further analysis;
- an input dataset generation module 426 for generating input datasets 428 for clustering. The module 426 includes modules for (i) detecting and segmenting powder particles in the input imagery, (ii) extracting and standardizing powder particle images, and/or (iii) calculating morphology metrics of the powder particles, examples of which are described above in reference to FIG. 1, according to some implementations; and
- a category identification module 420 for identifying categories 432 using the input datasets 428. In some implementations, the category identification module 430 identifies categories in the input dataset 428, based on geometry or morphology-based similarities between different particles, using K-means clustering on Hu invariant moments of the powder particle images.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 414 stores a subset of the modules and data structures identified above. Furthermore, the memory 414 may store additional modules or data structures not described above. The operations of each of the modules and properties of the data structures shown in FIG. 4 are further described below, according to some implementations.

Although FIG. 4 shows a computing device 400, FIG. 4 is intended more as a functional description of the various features that may be present rather than as a structural schematic of the implementations described herein. In practice, and as recognized by those of ordinary skill in the art, items shown separately could be combined and some items could be separated.

Details of the modules and data structures shown in FIG. 4 are described above in reference to FIGS. 1-3B, and further described below in reference to the flowchart shown in FIG. 5, according to some implementations.

Figure 5:
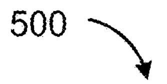
FIG. 5 shows a flowchart of an example method for particle morphology classification for manufactured parts, according to some implementations.
Figure 5:
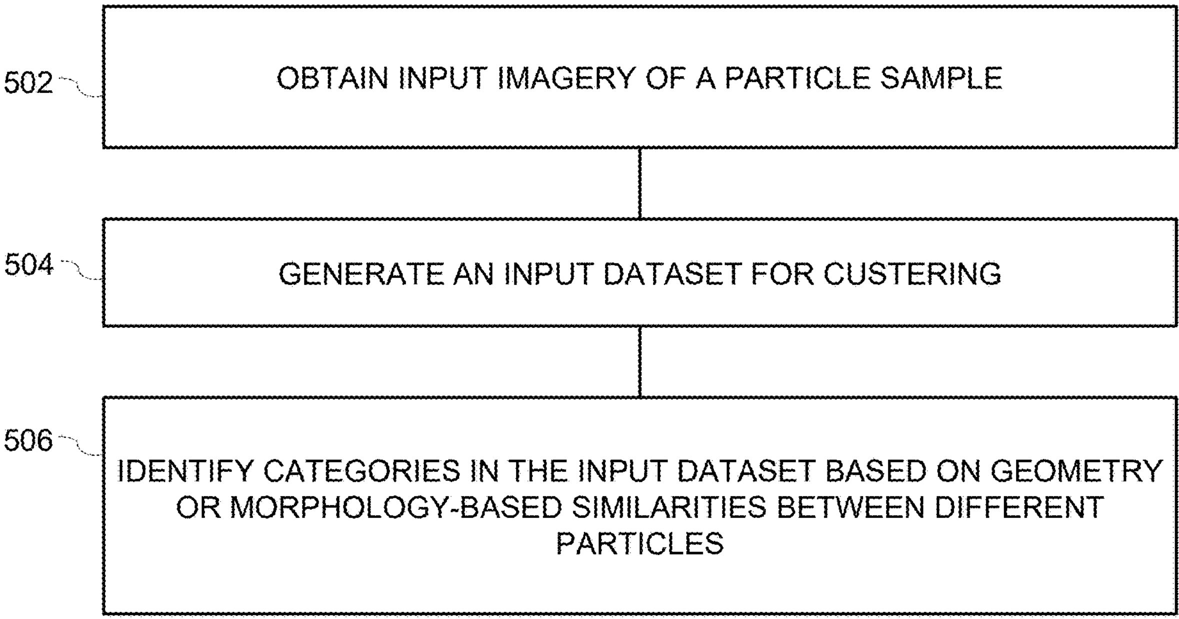

FIG. 5 shows a flowchart of an example method 500 for particle morphology classification, according to some implementations. The method is performed at an electronic device (e.g., the computer system 400) having one or more processors (e.g., the CPU(s)/GPU(s) 402), and memory (e.g., the memory 414) storing one or more programs, configured for execution by the one or more processors. The method includes: obtaining (502) (e.g., using the imaging module 422) input imagery of a particle sample that includes powder particles that are sintered together; generating (504) (e.g., using the input dataset generation module 426) an input dataset for clustering based on the input imagery, including (i) detecting and segmenting powder particles in the input imagery, (ii) extracting and standardizing powder particle images, and (iii) calculating morphology metrics of the powder particles; and identifying (506) (e.g., using the category identification module 430) categories in the input dataset, based on geometry or morphology-based similarities between different particles, using K-means clustering on Hu invariant moments of the powder particle images. Examples of these steps are described below, according to various implementations.

In some implementations, the method further includes receiving labels for the categories from a user, and subsequently using the categories to analyze or quantify future batches of particulate based on those labels. For example, the labels may be used to updated the identified categories 432.

In some implementations, the method further includes pre-categorizing the powder particles, based on size or other characteristics (e.g., rough shape, circularity) prior to clustering, in order to eliminate larger-scale differences between the powder particles (so that the K-means clustering can find more complex and/or subtle details). Larger-scale differences can include size categories and/or common shapes. These characteristics tend to have bimodal or trimodal distributions and are likely to have stronger weights than other characteristics of the subcategories. For example, in FIG. 2, a size classifier 204 classifies the input 202 based on sizes prior to further classification. In some implementations, the pre-categorizing is performed using a size classifier that classifies the powder particles into a plurality of size categories based on particle size distribution. In some implementations, each size category is further categorized using a respective K-means classifier. Each K-means classifier categorizes the powder particles into a respective set of one or more categories. An example of this step is described above in reference to FIG. 2. In some implementations, the plurality of size categories includes (i) a category for small particles, which accounts for a minimal amount of a total volume of the particle sample (e.g., an extremely high number of very small particles, which accounts for a minimal amount of the total volume-essentially dust created by friction between particles), (ii) a category for particles within predetermined size specifications (e.g., a large number of particles within the size specifications), and (iii) a category for particles that are outside of the predetermined size specifications or are defective (e.g., a smaller number of particles that are out of specification or defective in some way). Example size ranges for the categories include less than 10 micrometers for small particles, 10 to 100 micrometers for medium particles, and more than 100 micrometers for large particles.

In some implementations, the method further includes using multiple levels of unsupervised clustering to create groups within groups, when identifying the categories.

In some implementations, identifying the categories is performed using a multi-tiered classifier that incorporates a plurality of types of classifiers (e.g., a decision tree, a random forest, a k-means algorithm, an SVM, and/or a deep learner).

In some implementations, the method further includes receiving the number of desired categories from a user, and applying K-means clustering on Hu invariant moments to create the number of desired categories.

In some implementations, the method further includes: displaying identified categories to a user; receiving labels for the identified categories and a new set of categories after removal of redundant categories, from the user; and saving the model (e.g., as part of the category identification module 430) comprising the new set of categories and the labels for subsequent categorization of particle samples. In some implementations, the method further includes repeating applying the K-means clustering on Hu invariant moments to categorize the particle sample based on the new set of categories.

In some implementations, the method further includes: training random forest or support vector machine (SVM) classifiers on the Hu invariant moments; and using the trained random forest or SVM classifiers to further categorize the identified categories based on fundamental attributes of the identified categories.

In some implementations, the method further includes: training a convolutional neural network or a deep neural network on the input imagery based on the identified categories, to identify features; and using the trained convolutional neural network or the deep neural network to identify the features for particle samples. Neural networks typically provide higher classification accuracy than classification based on Hu moments due to the ability of neural networks to identify features with higher geometric complexity than can be represented in Hu moments.

In some implementations, the input imagery is obtained from an optical particle measurement system, an in-line imaging system, or similar flow-based particle imaging system (e.g., a Camsizer).

In some implementations, the K-means clustering ignores a metric of the Hu invariant moments that differentiates based on reflection, for particle morphology.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for particle morphology classification, the method comprising:

obtaining input imagery of a particle sample that includes powder particles that are sintered together;

generating an input dataset for clustering based on the input imagery, including (i) detecting and segmenting the powder particles in the input imagery, (ii) extracting and standardizing powder particle images, and (iii) calculating morphology metrics of the powder particles;

applying K-means clustering on Hu invariant moments of the input imagery to create categories by clustering a number of vectors/points into a number of categories based on proximity to other vectors;

identifying the categories based on geometry or morphology-based similarities between different particles; and sorting the powder particles based on the identified categories into accepted powder particles and rejected powder particles, wherein the accepted powder particles are inputs to a manufacturing operation, wherein the method further comprises:

training random forest or support vector machine (SVM) classifiers on the Hu invariant moments, and using the trained random forest or SVM classifiers to further categorize the identified categories based on fundamental attributes of the identified categories, and training a convolutional neural network or a deep neural network on the input imagery based on the identified categories, to identify features that are more geometrically complex than the identified categories and are more accurate than metrics-based measurements of the Hu invariant moments, and using the trained convolutional neural network or the deep neural network to identify the features for particle samples.

2. The method of claim 1, further comprising:

receiving labels for the categories from a user; and subsequently using the categories to analyze or quantify future batches of particulates based on the labels.

3. The method of claim 1, further comprising:

pre-categorizing the powder particles, based on size or other characteristics prior to clustering, in order to eliminate larger-scale differences between the powder particles.

4. The method of claim 3, wherein the pre-categorizing is performed using a size classifier that classifies the powder particles into a plurality of size categories based on particle size distribution.

5. The method of claim 4, wherein the plurality of size categories includes (i) a category for small particles, which accounts for a minimal amount of a total volume of the particle sample, (ii) a category for particles within predetermined size specifications, and (iii) a category for particles that are outside of the predetermined size specifications or are defective.

6. The method of claim 1, further comprising:

using multiple levels of unsupervised clustering to create groups within groups, when identifying the categories.

7. The method of claim 1, wherein identifying the categories is performed using a multi-tiered classifier that incorporates a plurality of types of classifiers.

8. The method of claim 1, further comprising:

displaying identified categories to a user;

receiving labels for the identified categories and a new set of categories after removal of redundant categories, from the user; and saving a model comprising the new set of categories and the labels for subsequent categorization of particle samples.

9. The method of claim 1, wherein the input imagery is obtained from an optical particle measurement system, an in-line imaging system, or similar flow-based particle imaging system.

10. The method of claim 1, wherein the K-means clustering ignores a metric of the Hu invariant moments that differentiates based on reflection, for particle morphology.

11. A computer system for physics simulation, comprising:

one or more processors; and memory;

wherein the memory stores one or more programs configured for execution by the one or more processors, and the one or more programs comprise instructions for performing the method of claim 1.

12. A non-transitory computer readable storage medium storing one or more programs configured for execution by a computer system having one or more processors and memory, the one or more programs comprising instructions for performing the method of claim 1.

13. The method of claim 1, wherein the rejected powder particles are recycled.

14. The method of claim 1, wherein the manufacturing operation is additive manufacturing.

15. The method of claim 1, wherein the manufacturing operation is solid fuel production.

* * * * *